US006904468B2

(12) United States Patent
Zayas et al.

(10) Patent No.: US 6,904,468 B2
(45) Date of Patent: Jun. 7, 2005

(54) METHOD FOR AN ALTERNATIVE IMPLEMENTATION OF VENDOR UNIQUE COMMANDS

(75) Inventors: Fernando A. Zayas, Loveland, CO (US); Tomas Blazek, Santa Clara, CA (US); Patrick Allen Hery, San Jose, CA (US)

(73) Assignee: Matsushita Electric Industrial Co, Ltd. (JP)

( * ) Notice: Subject to any disclaimer, the term of this patent is extended or adjusted under 35 U.S.C. 154(b) by 51 days.

(21) Appl. No.: 10/396,856

(22) Filed: Mar. 25, 2003

(65) Prior Publication Data

US 2004/0193747 A1 Sep. 30, 2004

(51) Int. Cl.[7] .............................................. G06F 13/00
(52) U.S. Cl. ............................. 710/5; 710/33; 710/104; 710/105; 710/313; 719/330; 713/1
(58) Field of Search ......................... 710/1–20, 33–35, 710/104–105, 313–315; 713/1–2; 714/718–723, 732–737; 719/330

(56) References Cited

U.S. PATENT DOCUMENTS

| 5,657,096 | A | * | 8/1997 | Lukacs | 348/585 |
|---|---|---|---|---|---|
| 6,381,697 | B1 | * | 4/2002 | Kawamura | 713/162 |
| 6,601,119 | B1 | * | 7/2003 | Slutz et al. | 710/104 |
| 6,654,821 | B1 | * | 11/2003 | Aikawa et al. | 710/36 |
| 6,694,381 | B1 | * | 2/2004 | Lo et al. | 710/5 |

* cited by examiner

Primary Examiner—Christopher B. Shin
(74) Attorney, Agent, or Firm—Fliesler Meyer LLP

(57) ABSTRACT

A method for implementing substantially all vendor unique commands in a host computer instead of an electronic store device. Alternative vendor unique commands are provided to implement a remote procedure call (RPC) protocol to implement vendor unique commands resident in the host computer with functions in the storage device. The storage device functions are substantially only the functions needed for normal, non vendor unique electronic storage device (ESD) operation. To facilitate access from the host computer to ESD functions, data, and constants, a symbol table of the storage device's software is used. The resulting system provides for a smaller code footprint in the storage device and easier to maintain and enhance function in the host computer.

20 Claims, 4 Drawing Sheets

METHOD FOR AN ALTERNATIVE IMPLEMENTATION OF VENDOR UNIQUE COMMANDS

CROSS REFERENCE TO RELATED APPLICATIONS

The present application is related to the following United States Patents and Patent Applications, which patents/applications are assigned to the owner of the present invention, and which patents/applications are incorporated by reference herein in their entirety: U.S. patent application Ser. No. 10/397,005 entitled "AN ALTERNATIVE IMPLEMENTATION OF VENDOR UNIQUE COMMANDS", filed on Mar. 25, 2003, currently pending.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to electronic storage devices, and more particularly to implementing vendor unique commands in electronic storage devices.

BACKGROUND OF THE INVENTION

Electronic storage device (ESD) technology is well developed and applications are widespread. To aid their design, development, maintenance, and support, ESDs include vendor unique commands (VUCs). I/O interface specifications for ESDs (e.g., SCSI, ATA) make provisions for vendor unique commands by setting aside a range of command codes for this use. Vendor unique commands are a set of commands carried by the protocols of the I/O interface specification created by storage device vendors for their own purposes, such as testing and verification of their designs. As the complexity of storage devices has increased, the number of VUCs has evolved to become a considerable amount of code.

An illustration of a system 100 for implementing VUCs in the prior art is shown in FIG. 1. System 100 includes a host or other type of computer 110 and an ESD 120 connected by an interface 150. Interface 150 may be implemented as a SCSI, ATA, or some other type of interface. Computer 110 includes a processor 111, RAM 112, ROM 113, and I/O interface 114. The ESD 120 includes processor 121, RAM 122, FLASH 123, media components 124, and I/O interface 126. In the prior art system 100, a quantity of code 130 includes a dispatcher 131 and vendor unique subroutines 132–134. Each subroutine may call on one or more functions, as illustrated by functions 1–3 in 135. The code 130 is typically executed from RAM 122, FLASH 123 or ROM (not shown).

In operation, host computer 110 will send a vendor unique command to the ESD 120 indicating that a particular VUC is to be executed. Upon receiving this command, the ESD runs a dispatcher 131 within code 130. The dispatcher will then call on the appropriate vendor unique subroutine. The vendor unique subroutine will typically involve executing a series of functions, the compilation of which is particular to the subroutine.

As discussed above, the amount of memory space taken by the code that implements the VUCs has increased as ESDs have evolved in complexity. What is needed is a method for providing VUCs that overcomes the disadvantages and limitations of the prior art.

SUMMARY OF THE INVENTION

The present invention provides a method for implementing alternate vendor unique commands. In one embodiment, the bulk of the code for implementing the functions of traditional vendor unique commands is implemented on a host computer. The host issues commands to an ESD to perform the functions of a vendor unique subroutine. The functions are resident in the ESD structure. In one embodiment, the commands transmitted to the ESD include an alternate vendor unique RPC setup, RPC data in, and RPC data out command that together implement a remote procedure call (RPC) protocol. In one embodiment, the host computer of the present invention has access to a symbol table that lists many of the functions, variables, and constants resident in the ESD. The symbol table may reside on the host computer, the ESD drive media, or some other source.

DETAILED DESCRIPTION

The present invention provides a system and method for implementing alternative vendor unique commands. In one embodiment, the bulk of the code for implementing the functions of traditional vendor unique commands is implemented on a host. The host issues commands to the ESD to perform the functions of a vendor unique subroutine. The commands are transmitted to and carried out by ESD functions already resident in the ESD structure. In one embodiment, the commands transmitted to the ESD may include an alternative vendor unique RPC setup, RPC data in, and RPC data out command that together implement an RPC protocol as the access method to the functions resident in the ESD. In one embodiment, the host computer of the present invention has access to a symbol table that lists functions, variables, and constants resident in the ESD. The symbol table may reside on the host computer, the ESD drive media, or some other source. The system of the present invention improves over the prior art in that the present invention does not require client specific code, memory space in the ESD is saved as the VUC subroutines are stored on a host computer, the alternative VUCs may be implemented on faster processors in the host computer as compared to the typically slower processors of the ESD, and code that runs in the host computer can be updated and maintained with less effort than code resident in the ESD.

Figure 2:
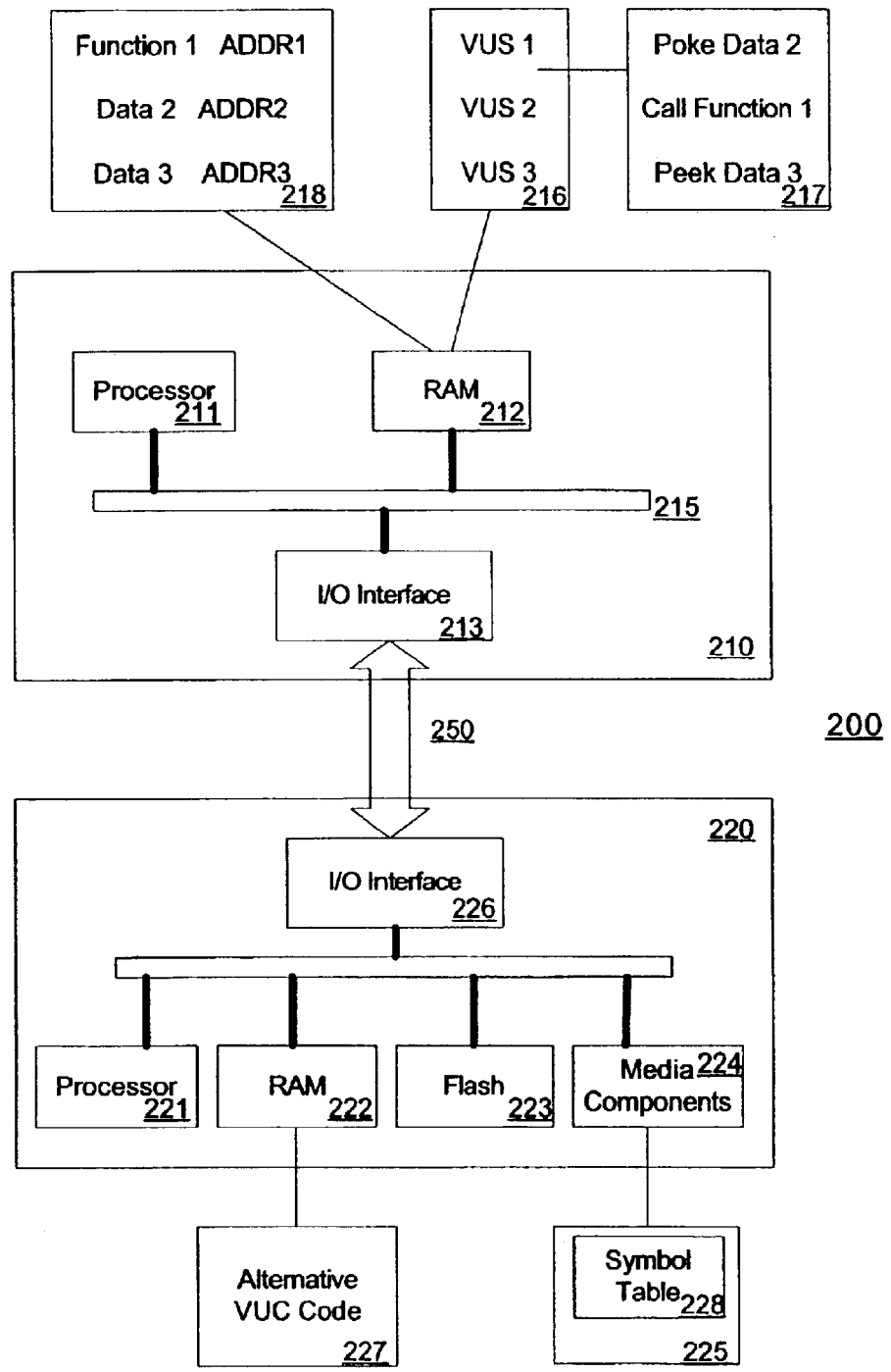
FIG. 2 is an illustration of a system for implementing alternative vendor unique commands in accordance with one embodiment of the present invention.

A system 200 for implementing alternative VUCs in one embodiment of the present invention is illustrated in FIG. 2.

System 200 includes host computer 210, ESD 220 and an interface 250 connecting the host computer and ESD. Examples of interfaces for use with the present invention include SCSI and ATA interfaces. Host computer 210 includes processor 211, RAM 212, I/O interface 213, all connected to system bus 215. This abstract view of a host computer is used for illustration purposes only. A host computer such as a typical PC contains many more components such as busses, memories, I/O devices, and other devices than those shown in FIG. 2. ESD 220 includes processor 221, RAM 222, Flash 223, media components 224 and I/O interface 226. Media components may include the disk media 225 as well as an actuator, coil, and other related devices not shown for purposes of simplifying the illustration.

In the embodiment shown, the vendor unique subroutine information is contained in code 216 that executes from RAM 212 and is stored in other memories of the host computer 210. Each vendor unique subroutine includes one or more functions such as the functions illustrated in 217. In the embodiment shown, a symbol table 218 is stored and accessed from the host computer's RAM 212. The symbol table 218 may be stored in other memories of the host computer 210, the ESD media disk 225 as shown by symbol table 228, or Flash (or other ROM) 223. The now alternative VUCs 227 implement an RPC (remote procedure call) protocol. The code that processes the alternative VUCs 227 and the alternative VUCs themselves may be stored in the RAM 222, Flash 223 or other ROM (not shown) or other memories on the ESD 220 (not shown). Before proceeding with a more detailed discussion of the present invention, a brief background of previous vendor unique command solutions and RPC mechanisms shall be presented.

Figure 1:
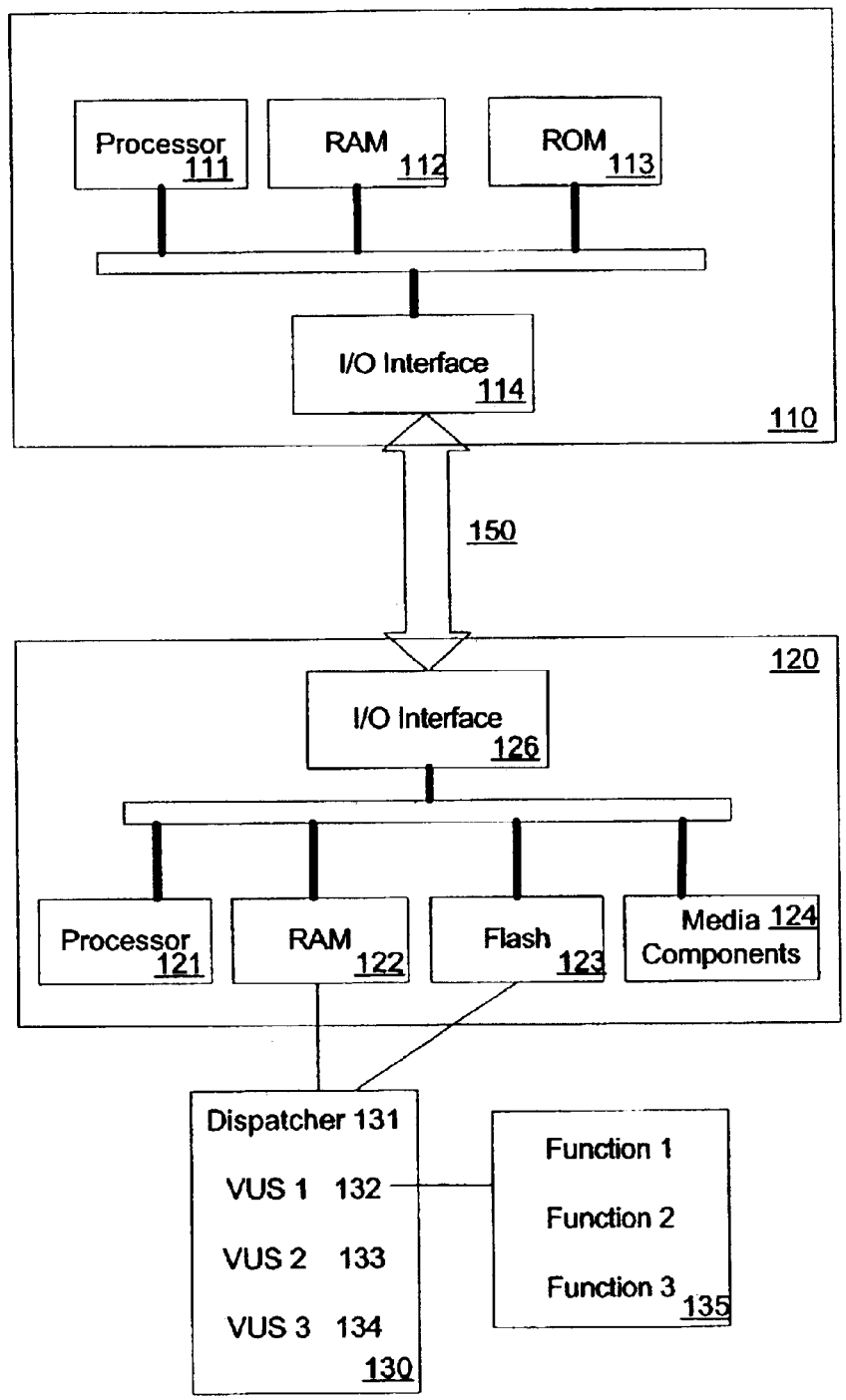
FIG. 1 is an illustration of a system for implementing vendor unique commands in accordance with the prior art.

Using established practice as shown in FIG. 1, a SEEK VUC may be considered as an example. The SEEK command is implemented using a dispatcher 131 to direct the execution to a vendor unique subroutine 132 specific to the SEEK command, all located within the ESD. Multiple calls to functions within the ESD reside within the vendor unique subroutine to accomplish the task. For purposes of illustration, consider the following dispatch and vendor unique subroutine code example:

```
// Dispatch based on opcode
else if ( vuParams.opCode == vuSeek ) status = VUSeek( vuParams ) ;
else if ( vuParams.opcode == ...
// Handle a request to seek to a physical location
tStatus VUSeek( VUParams vuParams ) {
    // Insure we're spinning and on track before we issue seek
    if ( Spindle: :State( ) != Spindle: :atSpeed ) return notSpinning;
    if ( ServoRT: :Thread( ) != ServoRT: :onTrack ) return notOnTrack;
    // Use zone setup to validate head and cylinder
    int cylinder  = vuParams.vuSeek.cylinder;
    int head      = vuParams.vuSeek.head;
    zone = RdWr: :SetupForZone( cylinder, head ) ;
    if ( zone > RdWr: :maxZoneNumber ) return badParameters;
    // Issue the seek
    int offset = vuParams.vuSeek.offset;
    return VCM: :SeekAndWait( cylinder, head, offset ) ;
}
```

With reference to the above code, assume that a data structure vuParams exists with fields opCode, status, and a union of structures, one of which is specific to the seek command, vuSeek, with fields cylinder, head, and offset. Within the VUS are several functions for configuring spinning, track and zone set-up. The vendor unique subroutine VUSeek( ) is only one of many subroutines that are implemented in ESDs of the prior art. The dispatcher and these many vendor unique subroutines take up execution and data space in the ESD. Further, they are harder to extend and maintain than if the equivalent code resided in a host computer such as a PC.

In one embodiment of the present invention, a portion of the code specific to vendor unique commands is moved into a host computer, leaving behind those functions (such as RdWr::SetupForZone( ) in this example) that are required for normal operation of the ESD. In many cases, these functions are part of the necessary functions of the ESD irrespective of their use for vendor unique commands. That is, these functions are part of the normal operation of the ESD. An RPC mechanism is used to allow the host computer to access and invoke the functions resident in the ESD. In this embodiment, the host computer and the ESD operate as two computers communicating over a network. The host computer is configured to access the VUS that resides on host computer memory. Once a VUC is accessed, the functions associated with the VUC are processed by the host computer and sent to the ESD. In one embodiment, processing the VUS functions includes generating alternative VUCs from each VUS function. The alternative VUCs are then transmitted from the host computer. As shown in FIG. 2, VUS 1 in 217 includes VUS functions 217, comprising a "Poke Data 2" function, "Call Function 1" function and "Peek Data 3" function. A series of alternative VUC is generated to implement each function. Specific alternative VUCs are discussed in more detail below.

Figure 3:
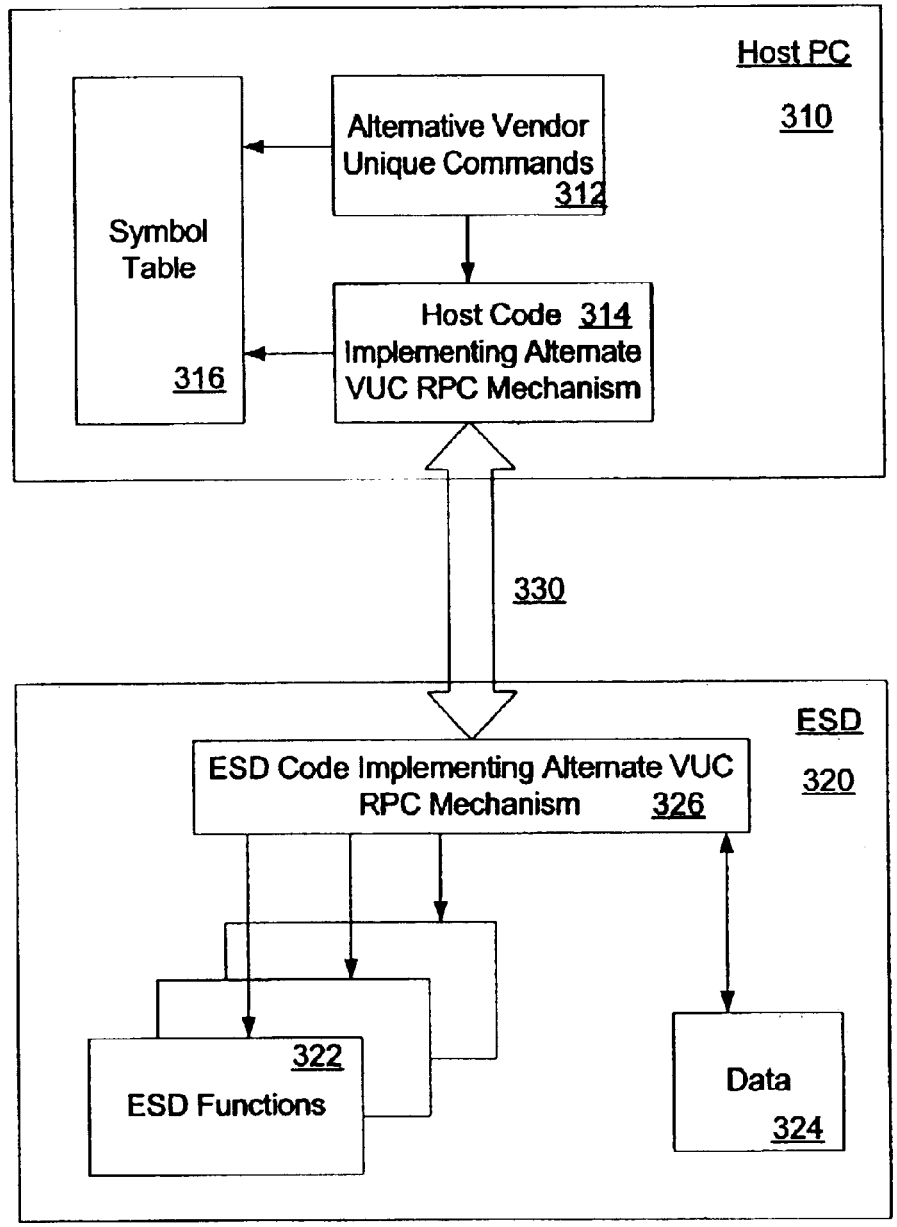
FIG. 3 is an illustration of a system for implementing alternative vendor unique commands using RPC from a computer in accordance with one embodiment of the present invention.

FIG. 3 illustrates a system 300 used to implement vendor unique commands using an RPC protocol in accordance with one embodiment of the present invention. System 300 includes host computer 310 and ESD 320, connected by interface 330. Host computer 310 includes alternative vendor unique commands 312, symbol table 316, and RPC mechanism 314. ESD 320 includes ESD functions 322, data 324, and code implementing alternative vendor unique commands RPC mechanism 326.

In one embodiment, system 300 utilizes command codes from the ATA specification that are set aside for vendor unique commands. In this embodiment, alternative vendor unique commands implementing RPC as illustrated by block 326 in FIG. 3 may include RPC setup, RPC data in, and RPC data out commands. These commands are sent from the host computer to the ESD. An RPC setup command indicates to the ESD what the next vendor unique command should do. In an embodiment where the RPC commands implement a call to an ESD function, the RPC setup command sends the parameter values and function address for a function to be called within the ESD to request a "call". In an embodiment where the RPC commands implement a read or write to a data address, RPC setup sends the data direction (in or out of an external host processor), starting address, and length to request a "peek" or "poke". Thus, an RPC setup command will include instructions that may include call, peek, and poke. In general, a call instruction calls an ESD function 322 on the ESD to be invoked, a peek instruction retrieves data from a memory location within data 324 on the ESD, and a poke instruction stores data to a memory location within data 324 on the ESD. An RPC data in command is issued from the host computer after an RPC setup command that requests either a call or peek instruction. For a "call", the RPC data in command returns the result of the "call"(the return value) to the host computer. For a "peek", the RPC data in command returns data from the ESD to the host computer. An RPC data out command is issued after an RPC setup command that requests a "poke". The RPC data out command sends data to the ESD.

Figure 4:
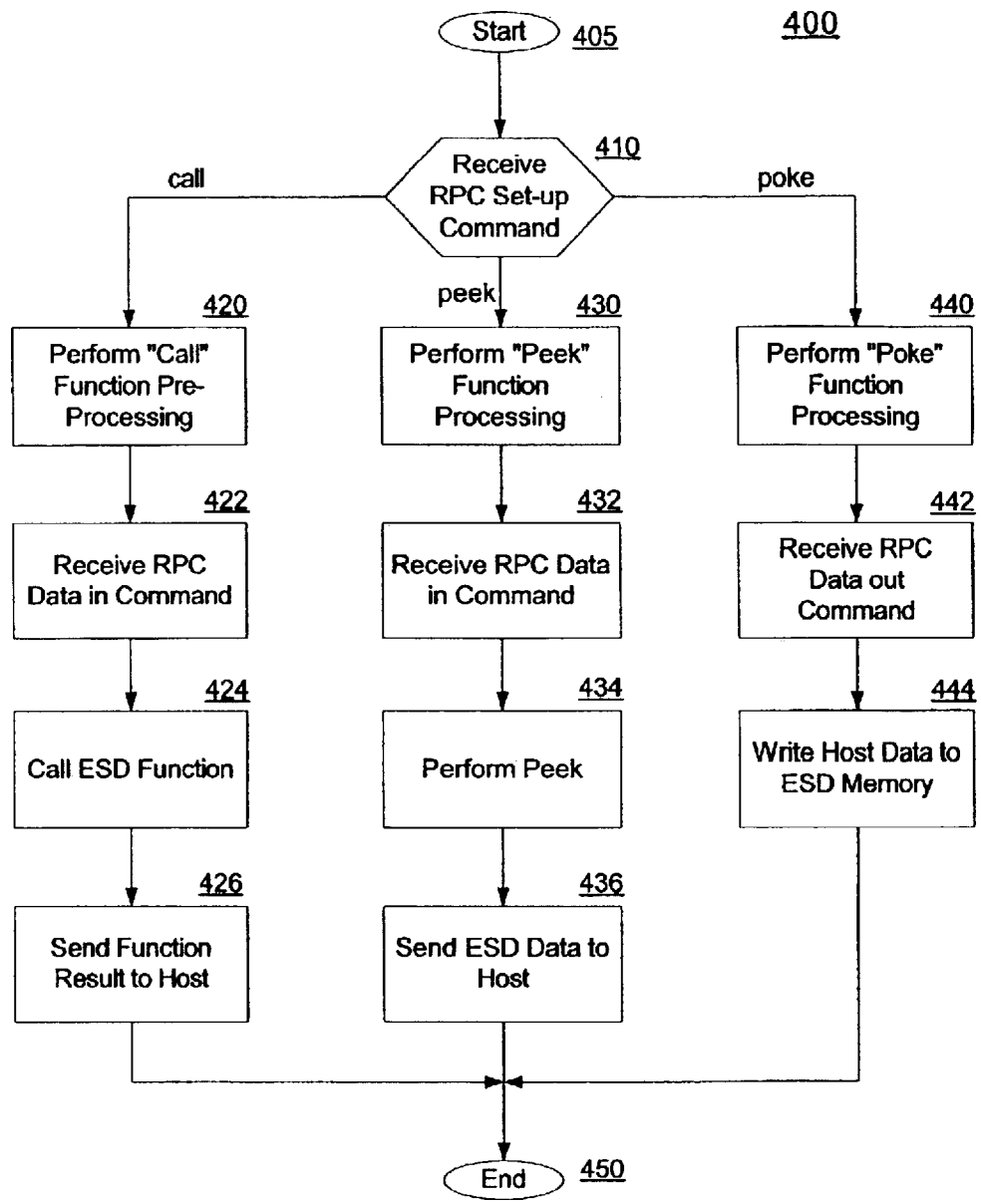
FIG. 4 is an illustration of a method for implementing alternative vendor unique commands is an ESD in accordance with one embodiment of the present invention.

The operation of ESD 300 of FIG. 3 is illustrated in method 400 of FIG. 4. FIG. 4 illustrates a method for implementing alternative vendor unique commands in an ESD in accordance with one embodiment of the present invention. Operation of method 400 begins with start step 405. Next, an RPC set-up command is received at step 410. In one embodiment, the content of the RPC set-up command indicates whether a call, peek or poke function is to be performed at the ESD. If a call function is to be performed, operation continues to step 420. Call function pre-processing is performed at step 420. In one embodiment, call function pre-processing includes saving the parameters and function address delivered in the RPC set-up command. Next, an RPC data in command is received at step 422. The data in command requests that the ESD function be called, passing the function parameters previously stored. Next, the ESD function is invoked at step 424. After a result is generated, the function result (the return value of the function) is sent to the host at step 426 as the response to the RPC data in command. Operation then ends at step 450.

If a peek function is to be performed at step 410, operation continues to step 430. Peek function processing is performed at step 430. In one embodiment, peek function processing includes storing peek parameters received in the RPC set-up command, such as the starting address and transfer length. Next, an RPC data in command is received at step 432. The data in command is what receives the data requested in the RPC set-up command received earlier. Next, the peek operation is performed at step 434. The peek operation retrieves data from a specified ESD memory address(es). Once the data is retrieved, the ESD data is sent to the host at step 436 as the response to the RPC data in command. Operation then ends at step 450.

If a poke function is to be performed at step 410, operation continues to step 440. Poke function processing is performed at step 440. In one embodiment, poke function processing includes storing the parameters of the "poke", such as the starting address and transfer length. Next, an RPC data out command is received at step 442. The RPC data out command is configured with the data to be written to the ESD memory. Next, the poke operation is performed at step 444 when data from the host is written to ESD memory. Operation then ends at step 450.

An additional alternative VUC implementing RPC could be configured to determine the address of functions, variables and constants within the ESD. In one embodiment, an alternative vendor unique command RPC lookup could be used to pass the ordinal or name of an element such as a function, variable, or constant, as contained in a symbol table, to the ESD. As a result, the ESD returns the named element's address. In another embodiment, the ESD may also return other information about the named element, including the type and length of a function, variable, or constant.

In another embodiment, a symbol table 316 is produced when the ESD's code is built. The symbol table can be used to resolve symbolic names used by the RPC mechanism 314. Using a symbol table 316 to resolve symbol addresses is well known to those skilled in the art. Using a table of addresses whose indices (ordinals) are aliases for symbols is another well known technique for resolving symbol addresses.

The code below shows an example of a subroutine implementing an alternative vendor unique physical seek command from the host computer, in accordance with one embodiment of the present invention. In the embodiment shown, the subroutine is implemented in Python. It will be understood by those in the art of ESD programming that the subroutine can be implemented in other formats and other programming languages. Accordingly, the scope of the present invention includes the teachings disclosed in other formats and programming languages. Rather than calling functions in the ESD directly as illustrated in the code above when the code was ESD resident, the functions are called from the host computer using an RPC protocol. In the embodiment shown, the constants that were directly accessible in the ESD are accessed from the symbol table.

```
// Vendor unique seek to a physical location
def Seek( head, cylinder, offset ) :
    // Insure we're spinning and on track before we issue seek
    res = RPC( 'Spindle: :State( )' ) ;
    if res != Lookup( 'Spindle: :atSpeed' ) :
        return notSpinning;
    res = RPC( 'ServoRT: :Thread( )' ) ;
    if res != Lookup( 'ServoRT: :onTrack' ) :
        return notOnTrack;
    // Use zone setup to validate head and cylinder
    zone = RPC( 'RdWr: :SetupForZone( )', cylinder, head ) ;
    if zone > Lookup( 'RdWr: :maxZoneNumber' ) :
        return badParameters;
    // Issue the seek
    res = RPC( 'VCM: :SeekAndWait( )', cylinder, head, offset ) ;
    return res;
```

In the code above, the RPC is implemented by first sending an RPC setup requesting a "call" with any arguments that follow the first as parameter values and then sending an RPC data in to retrieve the return value of the "call". In this embodiment, the first argument is the name, ordinal, or address of the ESD's function (the name is used here as RPC knows to ask the symbol table for address translation when passed a string). For example, the statement "RPC('Spindle:: State ( )')" calls the function "Spindle::State( )" without passing any parameters. The statement "RPC('RdWr::SetupForZone( )', cylinder, head )" calls the function "RdWr::SetupForZone( )" while passing parameters "cylinder" and "head". Not shown in this example are ReadSym and WriteSym to read and write data within the ESD. ReadSym first sends an RPC setup requesting a "peek" followed by an RPC data in to retrieve the data. WriteSym first sends an RPC setup requesting a "poke" followed by an RPC data out to send the data.

The present invention provides an alternative system and method for implementing vendor unique commands. In one embodiment, the bulk of the code for implementing traditional vendor unique commands is implemented on a host. These alternative implementation of vendor unique commands running in the host are able to call functions resident in the ESD and read data to and write data from the ESD via an RPC mechanism. In one embodiment, the commands transmitted to the ESD include an RPC setup, an RPC data in, and an RPC data out that together implement an RPC mechanism. In one embodiment, the host computer of the present invention has access to a symbol table that lists some of the functions, variables, and constants resident in the ESD. The symbol table may reside on the host computer, the ESD drive media, or some other source.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, implementing vendor unique subroutines.

What is claimed is:

1. A method for implementing vendor unique commands in a host computer having a memory, a processor, and an I/O interface, comprising:
   providing a vendor unique subroutine on the host computer memory;
   accessing the vendor unique subroutine; and
   transmitting an alternative vendor unique command, the alternative vendor unique command associated with the retrieved vendor unique subroutine.

2. The method of claim 1 wherein the vendor unique subroutine includes a vendor unique subroutine function.

3. The method of claim 2 wherein the alternative vendor unique command is derived from the vendor unique subroutine function.

4. The method of claim 3 wherein the alternative vendor unique command includes one of an RPC setup, RPC data in, and RPC data out command.

5. The method of claim 3 wherein transmitting an alternative vendor unique command includes:
   transmitting a first alternative vendor unique command; and
   transmitting a second alternative vendor unique command, the first and second alternative vendor unique command derived from the vendor unique subroutine function.

6. The method of claim 1 further comprising:
   retrieving a symbol table, the symbol table including electronic storage device symbol information.

7. The method of claim 6 wherein the electronic storage device symbol information includes functions addresses.

8. The method of claim 6 wherein the electronic storage device symbol information includes electronic storage device data addresses.

9. The method of claim 6 wherein the electronic storage device symbol information includes electronic storage device constants.

10. The method of claim 6 wherein retrieving a symbol table includes:
    retrieving the symbol table from the host computer memory.

11. The method of claim 6 wherein retrieving a symbol table includes:
    retrieving the symbol table from an electronic storage device.

12. The method of claim 7 wherein the electronic storage device symbol information includes a name for each of one or more compiled electronic storage device functions, the function addresses including an address location corresponding to each of the one or more compiled electronic storage device functions.

13. The method of claim 8 wherein the electronic storage device symbol information includes a name for each of one or more data locations in an electronic storage device, the electronic storage device data addresses including an address location corresponding to each of the one or more data locations.

14. A method for implementing vendor unique commands in an electronic storage device, comprising:
    receiving an alternative vendor unique command; and
    calling an electronic storage device resident function to implement the alternative vendor unique command.

15. The method of claim 14 wherein the alternative vendor unique command is one of an RPC setup, RPC data in, and RPC data out command.

16. The method of claim 14 further comprising:
    transmitting the result of the electronic storage device function.

17. A method for implementing vendor unique commands in an electronic storage device, comprising:
    receiving a first alternative vendor unique command;
    calling an electronic storage device function to implement the first alternative vendor unique command;
    receiving a second alternative vendor unique command; and
    calling an electronic storage device function to implement the second alternative vendor unique command.

18. The method of claim 17 wherein the first alternative vendor unique command is an RPC setup command.

19. The method of claim 17 wherein the second alternative vendor unique command is one of an RPC data out command or RPC data in command.

20. The method of claim 17 wherein the first and second alternative vendor unique commands implement a vendor unique subroutine function, the vendor unique subroutine function including one of a call, peek or poke function.

* * * * *